3,600,345
IMPROVED PREPOLYMER-MODIFIED
ALKYD RESINS
Eli Levine, Union, and Robert F. Singer, Middlesex, N.J., assignors to Celanese Corporation, New York, N.Y.
No Drawing. Filed Sept. 16, 1969, Ser. No. 858,529
Int. Cl. C08g 17/16; C09d 3/64
U.S. Cl. 260—22CB
7 Claims

ABSTRACT OF THE DISCLOSURE

An improved prepolymer-modified alkyd resin is produced by forming the polycondensation product of a polyhydric alcohol (e.g., pentaerythritol), a fatty acid or fatty acid oil (e.g., safflower fatty acids or safflower oil), a polycarboxylic acid or anhydride thereof (e.g., phthalic acid or phthalic anhydride), and a prepolymer derived from (1) a carboxy-substituted, ethylenically unsaturated polymerizable monomer (e.g., methacrylic acid); (2) a hydroxy-substituted, ethylenically unsaturated, polymerizable monomer (e.g., 2-hydroxyethyl methacrylate); and (3) a non-carboxy-non-hydroxy-substituted, ethylenically unsaturated, polymerizable monomer (e.g., methyl methacrylate, ethyl acrylate).

BACKGROUND OF THE INVENTION

This invention relates to alkyd resins of the type derived from polyhydric alcohols, polycarboxylic acids, and fatty acids. More particularly, it relates to an alkyd resin which is modified by the incorporation therein of the polymerization product of certain ethylenically unsaturated monomers.

It is known that a useful class of polyesters known as "oil-modified alkyd resins" (hereinafter called "alkyd resins") can be produced by the condensation reaction of polyhydric alcohols, polycarboxylic acids and fatty acids. It is also known that these alkyd resins can be modified by the incorporation therein of ethylenically unsaturated compounds capable of forming vinyl or acrylic homopolymers or copolymers (hereinafter collectively called "vinyl polymers"), e.g., styrene, methyl methacrylate, and the like. The term "ethylenically unsaturated" as used herein refers to monomers containing non-aromatic carbon-carbon double bonds which are capable of entering into olefin-type polymerization reactions. Coating formulations (e.g., paints) made from such "vinyl polymer-modified alkyd resins" exhibit improved gloss, caustic-resistance, water-resistance, fade-resistance, color-retention, and the like.

Vinyl polymer-modified alkyd resins have been made in the past by either of two procedures.

The first procedure involves contacting and reacting, under free radical polymerization conditions, one or more ethylenically unsaturated monomeric compounds (capable of forming a vinyl polymer) with either a pre-formed alkyd resin or, alternatively, with the alkyd resin precursors during the formation of the resin. This method suffers from the disadvantage that the final product is a mixture of homopolymer or copolymer (derived from the vinyl polymer-forming monomer or monomers), unmodified alkyd resin, and vinyl polymer-modified alkyd resin. While the final product may have an acceptably low viscosity, the components of this mixture are often only marginally compatible, resulting thereby in paints and other coatings having poor shelf-stability and uniformity.

The second procedure involves the formation of a vinyl polymer containing pendant carboxy substituents, followed by reaction of this "prepolymer" with the partial ester of a fatty acid and a polyhydric alcohol (i.e., an ester in which not all the hydroxy substituents are esterified), either before, during, or after the condensation of said partial ester with the polycarboxylic acid component of the alkyd resin. This method has the advantage of providing resins of improved uniformity compared to the resins prepared in the first procedure described above. However, the modification of an alkyd resin by grafting thereon a prepolymer having sufficient carboxylic acid functionality to ensure a uniform, haze-free resin, often results in a final product which is too viscous to permit convenient handling, thus diminishing the utility of the process.

SUMMARY OF THE INVENTION

Therefore, it is an object of the present invention to provide an improved alkyd resin suitable for use as a paint vehicle and in other coating applications.

Another object is to provide an improved, uniform, haze-free, prepolymer-modified alkyd resin of sufficiently low viscosity to permit convenient handling.

Another object is to provide a process for producing an improved alkyd resin suitable for use as a paint vehicle and in other coating applications.

Yet another object of the present invention is to provide a process for producing an improved, uniform, haze-free, prepolymer-modified alkyd resin of sufficiently low viscosity to permit convenient handling.

These and other objects of the preesnt invention, as well as the advantages thereof, can be had by reference to the following detailed description and claims.

Broadly, the above objects are achieved according to the present invention by forming a vinyl polymer containing not only carboxy substituents (i.e., —COOH substituents), but also hydroxy substituents i.e., 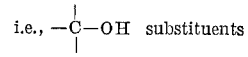 substituents as well, and reacting this polymer (hereinafter "vinyl prepolymer" or "prepolymer") with a mixture of alkyd resin components or precursors, i.e., a polycarboxylic acid (or, alternatively, the corresponding anhydride), a polyhydric alcohol, and a fatty acid (or, alternatively, the corresponding triglyceride or fatty acid oil).

It is a feature of the present invention that the vinyl prepolymer is derived from a monomer charge in which: (1) at least about $N_1(0.25)/N_2$ percent by weight and desirably between about $N_1(0.25)/N_2$ percent by weight and about $N_1(10)/N_2$ percent by weight of the charge is made up of carboxy-substituted, ethylenically unsaturated, polymerizable monomers; and (2) at least about $$N_1'(0.50)/N_3$$

percent by weight and desirably between about $$N_1'(0.50)/N_3$$

percent by weight and about $N_1'(12)/N_3$ percent by weight of the charge is made up of hydroxy-substituted, ethylenically unsaturated, polymerizable monomers. In the above expressions, $N_1$ denotes the number of ethylenic bonds per molecule of carboxy-substituted monomer capable of entering into olefin-type polymerization reactions, $N_1'$ denotes the number of ethylenic bonds per molecule of hydroxy-substituted monomer, $N_2$ denotes the number of carboxy substituents per molecule of carboxy-substituted monomer, and $N_3$ denotes the number of hydroxy substituents per molecule of hydroxy-substituted monomer. For example, when $N_1$, $N_1'$, $N_2$ and $N_3$ are all equal to unity, the carboxy-substituted monomer will contain one ethylenic double bond and one carboxy substituent per molecule, and the hydroxy-substituted monomer will likewise contain one ethylenic bond and one hydroxy substituent per molecule. When a plurality of carboxy-substituted monomers and a plurality of hydroxy-substituted monomers are used, $N_1$, $N_1'$, $N_2$, and $N_3$ will accordingly represent average values. Preferably, the prepolymer is derived from a monomer charge in which: (1) between about $N_1(2)/N_2$ percent by weight and about $N_1(7)/N_2$ percent by weight of the charge is made up of the aforementioned carboxy-substituted monomers; and (2) between about $N_1'(2)/N_3$ percent by weight and about $N_1'(10)/N_3$ percent by weight of the charge is made up of the aforementioned hydroxy-substituted monomers.

It is also a feature of the present invention that carboxy-substituted monomers and hydroxy-substituted monomers suitable for use in preparing vinyl prepolymer have molecular weights of less than about 200. Such monomers are further characterized in that $N_1$ and $N_1'$ are preferably between 1 and about 2, while $N_2$ and $N_3$ are preferably between 1 and about 3.

Typical carboxy-substituted, ethylenically unsaturated, polymerizable monomers suitable for use in the present invention include acrylic acid ($N_1=1$; $N_2=1$); lower alkyl and aryl derivatives of acrylic acid, e.g., methacrylic acid, alpha-phenylacrylic acid, cinnamic acid; maleic acid ($N_1=1$; $N_2=2$); fumaric acid ($N_1=1$; $N_2=2$); crotonic acid ($N_1=1$; $N_2=1$); lower alkyl and aryl derivatives of crotonic acid, e.g., tiglic acid, angelic acid, alpha-phenylcrotonic acid; and itaconic acid ($N_1=1$; $N_2=2$). Especially preferred carboxy-substituted, ethylenically unsaturated monomers are those in which $N_1=1$ and the ethylenic bond is terminal, i.e., carboxy-substituted, monoethylenically unsaturated monomers in which the ethylenic bond is in the form of a $H_2C=C<$ substituent. In formulating the prepolymer according to the present invention, the carboxy-substituted portion of the monomer charge can be derived either from a single carboxy-substituted monomer, or alternatively, from a plurality of such monomers.

Typical hydroxy-substituted, ethylenically unsaturated, polymerizable monomers suitable for use in the present invention include hydroxy-substituted lower alkyl esters of alpha,beta-unsaturated carboxylic acids, e.g., 2-hydroxyethyl acrylate ($N_1'=1$; $N_3=1$), and 2-hydroxypropyl acrylate, 4-hydroxybutyl acrylate, and the corresponding methacrylate derivatives. Also suitable are the partial alkenyl ethers of polymethylol alkanes, e.g., trimethylol propane monoallyl ether ($N_1'=1$; $N_3=2$) and pentaerythritol monoallyl ether ($N_1'=1$; $N_3=3$). In general, it is preferred to use hydroxy-substituted monomers in which $N_1'=1$ and the ethylenic bond is terminal, i.e., hydroxy-substituted monoethylenically unsaturated monomers in which the ethylenic bond is in the form of a $H_2C=C<$ substituent. As indicated above in connection with the carboxy-substituted, ethylenically unsaturated monomer component of the prepolymer, the aforementioned hydroxy-substituted, ethylenically unsaturated monomers can be used either individually or as mixtures of a plurality of such monomers. In the case of certain suitable hydroxy-substituted monomers, namely, the 2-hydroxy-alkyl esters of ethylenically unsaturated carboxylic acids, such monomers can be prepared in situ by reaction between the appropriate carboxylic acid and epoxide. Alternatively, the vinyl prepolymer can be "derived" from 2-hydroxyalkyl esters of ethylenically unsaturated carboxylic acids in the sense that the prepolymer is synthesized using the corresponding carboxylic acid and then treated with an appropriate epoxide to convert the corresponding pendant carboxy substituents to carbo-2-hydroxyalkoxy substituents.

The balance of the monomer charge used in preparing the prepolymer, i.e., the non-carboxy-non-hydroxy-substituted ethylenically unsaturated, polymerizable monomer portion of the monomer charge, can be made up of one or more of those ethylenically unsaturated, polymerizable monomers conventionally used in the art to make vinyl and acrylic polymers. Typical examples of non-carboxy-non-hydroxy-substituted monomers include vinyl hydrocarbons, e.g., ethylene, propylene, butadiene, styrene, alpha-methyl styrene, alpha-ethyl styrene, allyl benzene; vinyl halohydrocarbons, e.g., chloroprene, vinyl chloride; lower alkyl esters of alpha,beta-unsaturated carboxylic acids, e.g., methyl acrylate, ethyl acrylate, butyl acrylate, methyl methacrylate, butyl methacrylate; and vinyl esters, e.g., vinyl acetate, vinyl propionate. Other suitable non-carboxy-non-hydroxy-substituted monomers will readily suggest themselves to those skilled in the art. These monomers can be used individually as the non-carboxy-non-hydroxy substituted ethylenically unsaturated monomer component of the prepolymer. Alternatively, prepolymers can be derived from a plurality of such monomers, e.g., a combination of a vinyl hydrocarbon such as styrene and a lower alkyl ester such as methyl methacrylate. Other suitable combinations of non-carboxy-non-hydroxy-substituted ethylenically unsaturated monomers will readily suggest themselves to those skilled in the art. Especially preferred non-carboxy - non - hydroxy-substituted monomers are monoethylenically unsaturated monomers containing a $$H_2C=C<\text{substituent}$$

It would be expected by those skilled in the alkyd resin art that the use of a prepolymer having a multiplicity of hydroxylated substituents (i.e., carboxy and hydroxy substituents) would result in the final alkyd resin having excessively high viscosities. However, the surprising discovery has been made that such undesirable high viscosities do not accrue. Thus, increasing the number acid equivalents of a prepolymer containing only pendant carboxy substitutents increases markedly the viscosity of the resin product. This is an expected result. However, the introduction of hydroxy substituents into the prepolymer in an amount substantially equal in number to the additional quantity of acid equivalents referred to above, unexpectedly results in a great reduction in the viscosity of the final resin.

The mechanism by which the advantages of the present invention are achieved is not clearly understood. However, without wishing to be bound by theory, it is believed that intramolecular interactions occurring between the carboxy and hydroxy substituents in the prepolymer give rise to a "coiled" or "bunched" conformation, as opposed to a relatively linear conformation which results when the prepolymer contains only carboxy substituents. Hence, the somewhat more "compressed" geometry of the prepolymer-modified alkyd resin brought about by the concomitant presence of carboxy substituents and hydroxy substituents on the prepolymer molecule may explain the beneficial reduction in viscosity made possible by the present invention.

The prepolymer employed in the present invention is produced in a conventional manner, e.g., by means of known aqueous emulsion polymerization techniques or by solution polymerization in a suitable solvent, with the latter method being preferred. In either case, the polymerization occurs homolytically with the aid of any suitable, conventional, free-radical-producing catalyst or initiator.

When forming the prepolymer under solution polymerization conditions, the solvent employed can be any suitable solvent conventional in the solution polymerization art, e.g., aliphatic and aromatic hydrocarbons such as Decalin, xylene, toluene, and the like.

Any free-radical catalyst or combination of catalysts conventionally known to be useful in solution polymerization can be utilized, e.g., organic peroxide catalysts such as benzoyl peroxide, dicumyl peroxide, azodiisobutyronitrile, and the like. As a general rule, the amount of catalyst or catalysts employed is such as to provide a prepolymer having an average molecular weight of desirably between about 4500 and about 25,000, and preferably between about 6000 and about 12,000. Accordingly, the amount of catalyst is desirably between about 0.1 percent (to produce relatively high molecular weight prepolymers) and about 10 percent (to produce relatively low molecular weight prepolymer) by weight, based on the total weight of the monomer charge.

The polymerization of the monomer charge is generally conducted at atmospheric pressure, although higher pressures, e.g., autogenous pressure, are advantageously employed when the monomer charge contains a normally gaseous component, e.g., ethylene.

The temperatures employed in the polymerization of the monomer charge are those e.g., between about 50° C. and about 200° C., which are effective in initiating and completing the polymerization within a reasonably short period of time, e.g., on the order of a few hours.

The alkyd resins which are modified by grafting thereon the above-described vinyl prepolymers according to the present invention include any such alkyd resin conventional in the art. Suitable alkyd resins are derived from three general components: (1) a polyhydric alcohol (or mixture thereof); (2) a polycarboxylic acid or anhydride (or mixture thereof; and (3) a fatty acid (or mixture thereof).

Polyhydric alcohols suitable for preparing the alkyd resin include any alcohol containing at least two and preferably at least three esterifiable hydroxy substituents. Examples of such polyhydric alcohols are ethylene glycol, glycerol, pentaerythritol, dipentaerythritol, trimethylolethane, trimethylolpropane, sorbitol, and the like. When a dihydric alcohol is used, it is generally employed conjointly with one or more alcohols containing at least 3 esterifiable hydroxy substituents.

Polycarboxylic acids or anhydrides thereof suitable for preparing the alkyd resin include any carboxylic acid containing at least two esterifiable carboxy substituents. Examples of such polycarboxylic acids are maleic acid (or maleic anhydride), fumaric acid, succinic acid (or succinic anhydride), adipic acid, cyclohexane-1,4-dicarboxylic acid, isophthalic acid, phthalic acid (or phthalic anhydride,) trimesic acid, and the like. In addition, a monocarboxylic acid, e.g., benzoic acid, can be included as an ancillary component which serves, inter alia, to limit the molecular weight of the alkyd resin and prevent thereby the development of excessive viscosities.

Fatty acids suitable for preparing the alkyl resin include any long chain, polyethylenically unsaturated carboxylic acid which is a member of the class known as the "drying oil acids." Examples of such acids are linoleic acid, linolenic acid, licanic acid, eleostearic acid, and the like. Alternatively, the drying oils themselves, e.g., tung oil, linseed oil, safflower oil, soybean oil, and the like, can be utilized by direct alcoholysis with the aforementioned polyhydric alcohols, usually in the presence of a conventional, transesterification catalyst, e.g., litharge, sodium hydroxide, and the like. Optionally, the alkyl resin can be prepared from fatty acids which are long-chain, saturated carboxylic acids and which are members of the class known "non-drying oil acids." Examples of such acids are lauric acid, myristic acid, palmitic acid, and stearic acid. Alternatively, the non-drying oils themselves, e.g., peanut oil, rape oil, olive oil, castor oil, and the like, can be utilized, preferably in conjunction with a suitable conventional, transesterification catalyst. Also useful as the fatty acid component of the alkyd resin are any one or more of the long-chain, monoethylenically unsaturated carboxylic acids known as "semi-drying oil acids." Examples of such acids are oleic acid, ricinoleic acid, vaccenic acid, and erucic acid. Alternatively, the semi-drying oils themselves, e.g., corn oil, sesame oil, cottonseed oil, and the like, can be utilized, preferably in conjunction with a suitable, conventional, transesterification catalyst. Generally, if a drying oil or drying oil acid is used in preparing the prepolymer-modified alkyd resin, said resin will be curable by exposure to air and therefore useful in coating applications such as paints. On the other hand, if a non-drying oil acid is used, the resulting resin product of the present invention will be useful in "baked-on" coating applications and as plasticizers.

The alkyd resin formation step of the present invention can be carried out in any conventional manner, except that such step is conducted in the reactive presence of the above-described prepolymer (to give a prepolymer-modified alkyd resin). Thus, the precursors of the alkyd resin can be admixed with the prepolymer and the resulting mixture subjected to esterification conditions. For example, the aforementioned mixture can be heated at a temperature generally in the range of from about 200° C. to about 275° C., with the inherent acidity of the system providing the necessary catalysis. Alternatively, the above heating can be conducted in the chemical presence of a separate acid catalyst, e.g., para-toluene sulfonic acid. This latter variant is especially preferred when the polycarboxylic acid is used in the form of an anhydride and the fatty acid is used in the form of the corresponding triglyceride or fatty acid oil.

The prepolymer-modified alkyd resin can also be prepared by a two-step procedure which comprises (1) heating a mixture of prepolymer, polyhydric alcohol, and fatty acid (or fatty acid oil) under esterification conditions of the type described hereinabove, and (2) adding the polycarboxylic acid (or corresponding anhydride) to the composition formed in step (1) and further heating the resulting mixture under suitable esterification conditions, e.g., at a temperature of between about 200° C. and about 275° C., to form the prepolymer-modified alkyd resin.

When forming the prepolymer-modified alkyd resin according to the present invention, it is preferred to employ the two-step approach outlined above when using a fatty acid oil in lieu of the free fatty acid in order to ensure a resin which on deposition forms a clear film. On the other hand, when a free fatty acid is used, the above-described one-step procedure is preferred for convenience, although the two-step procedure can also be employed.

The alkyd resin-forming step of the present process is preferably conducted with the use of an inert solvent, or plurality thereof. If it is desired to employ a solvent, it is preferred to use one which is the same as, or at least compatible with, the solvent used to form the prepolymer. Such solvents include aliphatic and aromatic hydrocarbons, e.g., Decalin, toluene, xylene, and the like.

According to a preferred mode of carrying out the process of the present invention, a solution of part of the total amount of required free radical polymerization catalyst in an inert, high-boiling, liquid hydrocarbon is charged to a suitable, conventional reaction vessel and heated to a polymerization temperature of between about 50° C. and about 150° C. The exact temperature depends, inter alia, on the nature of the catalyst. The contents of the reaction vessel are kept under an inert atmosphere such as nitrogen. Next, a mixture comprising the prepolymer components (i.e., carboxy-substituted, hydroxy-substituted, and non-carboxy-nonhydroxy-substituted, ethylenically unsaturated, polymerizable monomers) is added to the reaction vessel over a period of between about 1 and about 6 hours. Concurrently with the above addition, there is likewise added a solution of the remainder of the required catalyst in the aforementioned inert, high-boiling solvent, i.e., a solvent whose normal boiling point is at least as high as the aforementioned polymerization temperature.

The pressure of the reaction system is preferably maintained at 1 atmosphere when all the prepolymer components are either liquid or solid under normal conditions. However, it is convenient and desirable to employ autogenous pressure when one or more of the monomers is a gas (e.g., ethylene, propylene, and the like).

When the additions of monomer charge and catalyst solution are completed, the reaction mixture is stirred at the aforementioned pressure, elevated temperature, and under an inert atmosphere for an additional period of time of between about 0.5 hour and about 2 hours and then allowed to cool to a temperature of between about 35° C. and about 50° C.

The cooled reaction mixture containing prepolymer dissolved in the aforementioned organic hydrocarbon solvent is charged to a second conventional reaction vessel together with the alkyd resin components (i.e., polyhydric alcohol; polycarboxylic acid or corresponding anhydride; fatty acid or fatty acid oil; and, if desired, an acid esterification catalyst and a monocarboxylic acid such as benzoic acid which functions as a molecular weight regulator). It is preferred that the amount of prepolymer employed corresponds to between about 5 percent by weight and about 50 percent by weight of the prepolymer-modified alkyd resin. The reactor charge is then heated in an inert atmosphere (e.g., nitrogen), with removal of solvent by distillation until the temperature is between about 220° C. and about 250° C. This temperature is maintained until the acid number of the reaction mixture has decreased to a value indicating substantially complete esterification of the carboxylic acid substituents originally present on the prepolymer as well as the carboxylic acid substituents derived from the alkyd resin components. Generally, the final acid number should be as low as possible, with an acid number of less than about 15 being preferred, especially when the prepolymer-modified alkyd resin is intended for housepaint applications.

Thereafter, the resulting prepolymer-modified alkyd resin is processed (e.g., into coating formulations and the like) in a manner conventional in the art.

The prepolymer-modified alkyd resins of the instant invention are superior to hitherto known prepolymer-modified alkyd resins of comparable acid number because the present resin compositions are of significantly lower viscosity, as demonstrated in the following examples.

The following examples are presented for the purpose of illustrating (but not limiting) the process and product of the present invention as well as the advantages thereof. Parts and percentages are by weight unless otherwise indicated.

Examples III, IV, and VI illustrate the production of prepolymer-modified alkyd resins according to the present invention.

Examples I, II, and V are provided to illustrate the comparatively less desirable properties of alkyd resins conventionally modified with vinyl polymers containing pendant carboxy substituents but no pendant hydroxy substituents.

EXAMPLE I (A) Preparation of vinyl polymer containing 3 percent methacrylic acid

| Materials | Parts | |
|---|---|---|
| Methyl methacrylate (0.005% MEHQ) [1] | 112.5 | A |
| Ethyl acrylate (0.005% MEHQ) | 157.0 | |
| Methacrylic acid (0.01% MEHQ) | 8.3 | |
| Dicumyl peroxide | 5.0 | B |
| Xylene | 150.0 | |
| Dicumyl peroxide | 2.5 | C |
| Xylene | 315.0 | |
| Total | 750.3 | |

[1] MEHQ (hydroquinone, monomethyl ether) is added to stabilize the monomers prior to use.

Procedure

Mixture C is charged to a reactor equipped with a reflux condenser and an efficient stirring means. Mixtures A and B are placed in separate dropping funnels for delayed addition. Mixture C is heated to 135° C. under an inert atmosphere, e.g., nitrogen. Additions of mixtures A and B to the reactor are then begun: mixture A is added over a period of 2 hours and mixture B is added over a period of 2⅓ hours. A reaction temperature of 135° C. and stirring are maintained throughout the additions. All operations are performed at atmospheric pressure. When the additions are completed, the reaction system is held at 135° C. under an inert atmosphere for an additional hour. The reaction mixture, which is a clear solution, is then cooled to 40° C. and transferred to a suitable storage container. This "vinyl polymer" contains 37 percent non-volatiles and can be used directly in part B, below.

(B) Preparation of vinyl polymer-modified alkyd resin

| Materials: | Parts |
|---|---|
| Pentaerythritol (technical grade) | 159.1 |
| Safflower fatty acids | 635.6 |
| Phthalic anhydride | 105.1 |
| Benzoic acid | 77.4 |
| Vinyl polymer | 583.7 |
| | 1560.9 |

All of the above materials are charged to a reactor and heated under an inert atmosphere. Solvent (xylene) is removed through a Dean-Stark trap until the temperature of the reaction mixture reaches 225° C. This temperature is maintained until the reaction mixture has an acid value of less than about 10, after which the reaction system is cooled and the product transferred to a suitable container. The product has the following properties:

Non-volatile content—94.7%
Acid number—9.7
Brookfield viscosity (#7 spindle, 50 r.p.m.)—40,000 cps.

EXAMPLE II (A) Preparation of vinyl polymer containing 7.2 percent methacrylic acid

| Materials | Parts | |
|---|---|---|
| Methyl methacrylate (0.005% MEHQ) | 112.5 | A |
| Ethyl acrylate (0.005% MEHQ) | 145.0 | |
| Methacrylic acid (0.01% MEHQ) | 20.0 | |
| Dicumyl peroxide | 5.0 | B |
| Xylene | 150.0 | |
| Dicumyl peroxide | 2.5 | C |
| Xylene | 315.0 | |
| Total | 750.0 | |

The same procedure is used as in Example I, part A. The "vinyl polymer" obtained here contains 37 percent non-volatiles and can be used directly in part B, below.

(B) Preparation of vinyl polymer-modified alkyd resin

| Materials: | Parts |
|---|---|
| Pentaerythritol (technical grade) | 162.6 |
| Safflower fatty acids | 635.6 |
| Phthalic anhydride | 105.1 |
| Benzoic acid | 77.4 |
| Vinyl polymer | 579.6 |
| | 1560.3 |

The same procedure is used as in Example I, part B. The product has the following properties:

Non-volatiles content—94.3%
Acid number—[1] 13.6
Brookfield viscosity (#6 spindle, 5 r.p.m.)—100,000 cps.

[1] Heating is terminated at an acid number of 13.6 because the product is on the verge of gelation.

EXAMPLE III (A) Preparation of prepolymer containing carboxy and hydroxy substituents

| Materials | Parts | |
|---|---|---|
| Methyl methacrylate (0.005% MEHQ) | 66.0 | ⎫ |
| Ethyl acrylate (0.005% MEHQ) | 127.9 | ⎬ A |
| Methacrylic acid (0.01% MEHQ) | 6.4 | |
| 2-Hydroxyethyl methacrylate | 12.8 | ⎭ |
| Dicumyl peroxide | 4.2 | ⎫ B |
| Xylene | 266.3 | ⎭ |
| Dicumyl peroxide | 3.2 | ⎫ C |
| Xylene | 263.1 | ⎭ |
| Total | 749.9 | |

The same procedure is used as in Example I, part A. The prepolymer obtained here contains 28.7 percent non-volatiles and is suitable for use directly in part B, below.

(B) Preparation of prepolymer-modified alkyd resin

Materials: | Parts
--- | ---
Pentaerythritol (technical grade) | 155.4
Safflower fatty acids | 636.2
Phthalic anhydride | 104.8
Benzoic acid | 77.4
Prepolymer | 581.0
 | 1554.8

The same procedure is used as in Example I, part B. The product has the following properties:

Non-volatile content—94.9%
Acid number—9.9
Brookfield viscosity (#7 spindle, 50 r.p.m.)—13,000 cps.

EXAMPLE IV (A) Preparation of prepolymer containing carboxy and hydroxy substituents

| Materials | Parts | |
|---|---|---|
| Methyl methacrylate (0.05% MEHQ) | 112.5 | ⎫ |
| Ethyl acrylate (0.005% MEHQ) | 127.5 | ⎬ A |
| Methyacrylic acid (0.01% MEHQ) | 20.0 | |
| 2-Hydroxyethyl methacrylate | 17.5 | ⎭ |
| Dicumyl peroxide | 5.0 | ⎫ B |
| Xylene | 150.0 | ⎭ |
| Dicumyl peroxide | 2.5 | ⎫ C |
| Xylene | 315.0 | ⎭ |
| Total | 750.0 | |

The same procedure is used as in Example I, part A. The prepolymer obtained here contains 37 percent non-volatiles and can be used directly in part B, below.

(B) Preparation of prepolymer-modified alkyd resin

Materials: | Parts
--- | ---
Pentaerythritol (technical grade) | 159.1
Safflower fatty acids | 635.6
Phthalic anhydride | 105.1
Benzoic acid | 77.4
Prepolymer | 579.0
 | 1556.2

The same procedure is used as in Example I, part B. The product has the following properties:

Non-volatiles content—94.2%
Acid number—12.1
Brookfield viscosity (#7 spindle, 5 r.p.m.)—[1] 80,000 cps.

[1] The reaction can be continued beyond this point without risk of gelation. At an acid number of 10, the Brookfield viscosity is about 100,000 cps.

EXAMPLE V

A) Preparation of vinyl polymer containing 5.4 percent methacrylic acid

| Materials | Parts | |
|---|---|---|
| Methyl methacrylate (0.005% MEHQ) | 112.5 | ⎫ |
| Ethyl acrylate (0.005% MEHQ) | 150.0 | ⎬ A |
| Methacrylic acid (0.01% MEHQ) | 15.0 | ⎭ |
| Dicumyl peroxide | 5.0 | ⎫ B |
| Xylene | 150.0 | ⎭ |
| Dicumyl peroxide | 2.5 | ⎫ C |
| Xylene | 315.0 | ⎭ |
| Total | 750.0 | |

The same procedure is used as in Example I, part A. The prepolymer obtained here contains 37 percent non-volatiles and can be used directly in part B, below.

(B) Preparation of vinyl polymer-modified alkyd resin

Materials: | Parts
--- | ---
Pentaerythritol (technical grade) | 194.3
Safflower fatty acids | 795.6
Phthalic anhydride | 128.8
Para-toluene sulfonic acid | 0.1
Vinyl polymer | 350.0
 | 1468.8

The same procedure is used as in Example I, part B. The product has the following properties:

Non-volatiles content—94.8%
Acid number—6.2
Brookfield viscosity (#7 spindle, 5 r.p.m.)—10,000 cps.

EXAMPLE VI (A) Preparation of prepolymer containing carboxy and hydroxy substituents

| Materials | Parts | |
|---|---|---|
| Methy methacrylate (0.005% MEHQ) | 86.0 | ⎫ |
| Ethyl acrylate (0.005% MEHQ) | 166.5 | ⎬ A |
| Methacrylic acid (0.01% MEHQ) | 8.3 | |
| 2-hydroxyethyl methacrylate | 16.7 | ⎭ |
| Dicumyl peroxide | 5.0 | ⎫ B |
| Xylene | 150.0 | ⎭ |
| Dicumyl peroxide | 2.5 | ⎫ C |
| Xylene | 315.0 | ⎭ |
| Total | 750.0 | |

The same procedure is used as in Example I, part A. The prepolymer obtained here contains 29 percent non-volatiles and can be used directly in part B, below.

(B) Preparation of propolymer-modified alkyd resin

Materials: | Parts
--- | ---
Pentaerythritol (technical grade) | 194.3
Safflower fatty acids | 795.2
Phthalic anhydride | 128.8
Para-toluene sulfonic acid | 0.1
Prepolymer | 463.2
 | 1581.6

The same procedure is used as in Example I, part B. The product has the following properties:

Non-volatiles content—94.8%
Acid number—6.5
Brookfield viscosity (#7 spindle, 5 r.p.m.)—2700 cps.

The data and results of Examples I–VI are summarized in the following tables:

TABLE 1

| Example | Percent non-volatiles in alkyd resin | Percent excess hydroxy in alkyd resin | Hydroxy-substituted and carboxy-substituted, monomer content of vinyl polymer or prepolymer | Number of equivalents donated by vinyl polymer or prepolymer | | | Final alkyd resin viscosity, cps. | Final acid number of alkyd resin |
|---|---|---|---|---|---|---|---|---|
| | | | | Carboxy | Hydroxy | Total | | |
| I | 94.7 | 2½ | 3.0% MAA [1] | 0.077 | ---------- | 0.007 | 40,000 | 9.7 |
| II | 94.3 | 2½ | 7.2% MAA | 0.184 | ---------- | 0.184 | 100,000 | [2] 13.6 |
| III | 94.9 | 2½ | 3.0% MAA / 6.0% HEM [3] | 0.077 | 0.098 | 0.175 | 13,000 | 9.9 |
| IV | 94.2 | 2½ | 7.2% MAA / 6.3% HEM | 0.185 | 0.104 | 0.289 | 80,000 | [4] 12.1 |

[1] MAA=Methacrylic acid.
[3] HEM=2-hydroxyethyl methacrylate.
[2] Heating had to be terminated at an acid number of 13.6 to avoid gelation.
[4] Heating could be continued to lower acid numbers without risk of gelation.

TABLE 2

| Example | Percent non-volatiles in alkyd resin | Percent excess hydroxy in alkyd resin | Hydroxy-substituted and carboxy-substituted, monomer content of vinyl polymer or prepolymer | Number of equivalents donated by vinyl polymer or prepolymer | | | Final alkyd resin viscosity, cps. | Final acid number of alkyd resin |
|---|---|---|---|---|---|---|---|---|
| | | | | Carboxy | Hydroxy | Total | | |
| V | 94.8 | 2½ | 5.4% MAA | 0.086 | ---------- | 0.086 | 10,000 | 6.2 |
| VI | 94.8 | 2½ | 3.0% MAA / 6.0% HEM | 0.047 | 0.062 | 0.109 | 2,700 | 6.5 |

Referring to Table 1, the results of Examples I and II indicate that, increasing the number of carboxy substituents on the vinyl polymer results in a drastic and undesirable increase in the viscosity of an alkyd resin modified with such a vinyl polymer. Example III indicates that, by introducing hydroxy substituents into a vinyl polymer of the type used in Examples I and II, a dramatic and wholly unexpected reversal in the tendency of the prepolymer-modified alkyd resin toward high viscosities is achieved. As a result, the prepolymer-modified alkyd resin of Example III can be "cooked" to a much lower acid number than heretofore possible without suffering from excessive viscosity. Example IV shows that the viscosity of a prepolymer-modified alkyd resin prepared according to the present invention has a significantly lower viscosity at an acid number of 12.1 than the vinyl polymer-modified alkyd resin of Example II (vinyl polymer contains carboxy but no hydroxy substituents) at a higher acid number (i.e., 13.6).

Referring to Table 2, the results of Examples V and VI indicate that a prepolymer-modified alkyd resin of the present invention (Example VI) has a much lower (and desirable) viscosity than a conventional vinyl polymer-modified alkyd resin (Example V) of comparable acid number and fewer total equivalents of hydroxylated substituents (i.e., hydroxy and carboxy substituents) on the prepolymer moiety.

We claim:

1. A prepolymer-modified alkyd resin which is produced by forming the homogeneous polycondensation product of:
   (a) an esterifiable polyhydric alcohol;
   (b) a saturated, monounsaturated, or polyunsaturated fatty acid or fatty acid oil;
   (c) a polycarboxylic acid or anhydride thereof; and
   (d) a prepolymer derived from:
      (1) a carbon-substituted, ethylenically unsaturated polymerizable monomer having a molecular weight of less than about 200;
      (2) a hydroxy-substituted, ethylenically unsaturated polymerizable monomer having a molecular weight of less than about 200 and selected from the group consisting of a lower hydroxyalkyl ester of an alpha, beta-unsaturated carboxylic acid, a partial alkenyl ether of a polymethylol alkane, or a partial alkenyl ether of a polyhydric aliphatic alcohol; and
      (3) a non-carboxy-non-hydroxy-substituted, ethylenically unsaturated, polymerizable monomer,
said prepolymer being further characterized in that the total amount of carboxy-substituted monomer constitutes between about $N_1(0.25)/N_2$ percent and about $N_1(10)/N_2$ percent by weight of the prepolymer, and the total amount of hydroxy-substituted monomer constitutes between about $N_1'(0.50)/N_3$ percent and about $N_1'(12)/N_3$ percent by weight of the prepolymer, wherein $N_1$ denotes the number of ethylenic bonds per molecule of carboxy-substituted monomre, $N_1'$ denotes the number of ethylenic bonds per molecule of hydroxy-substituted monomer, $N_2$ denotes the number of carboxy substituents per molecule of carboxy-substituted monomer, and $N_3$ denotes the number of hydroxy substituents per molecule of hydroxy-substituted monomer, said prepolymer being used in an amount corresponding to between about 5 percent and about 50 percent by weight of the prepolymer-modified alkyd resin.

2. A prepolymer-modified alkyd resin according to claim 1 wherein:
   the total amount of carboxy-substituted monomer constitutes between about $N_1(2)/N_2$ percent and about $N_1(7)/N_2$ percent by weight of the prepolymer;
   the total amount of hydroxy-substituted monomer constitutes between about $N_1'(2)/N_3$ percent and about $N_1'(10)/N_3$ percent by weight of the prepolymer;
   $N_1$ and $N_1'$ each have a value between 1 and about 2; and
   $N_2$ and $N_3$ each have a value between 1 and about 3.

3. A prepolymer-modified alkyd resin according to claim 2 wherein:
   the carboxy-substituted monomer is acrylic acid, lower alkyl or aryl derivatives of acrylic acid, lower alkyl or aryl derivatives of methacrylic acid, maleic acid, fumaric acid, or itaconic acid; and
   the non-carboxy-non-hydroxy-substituted monomer is a vinyl hydrocarbon, a vinyl halohydrocarbon, a lower alkyl ester of an alpha,beta-unsaturated carboxylic acid, or a vinyl ester of a lower carboxylic acid.

4. A prepolymer-modified alkyd resin according to claim 3 wherein:
   the polyhydric alcohol in (a) is glycerol, pentaerythritol, dipentaerythritol, trimethylolethane, trimethylolpropane, or sorbitol;
   the polyunsaturated fatty acid or fatty acid oil in (b) is soybean oil, soybean fatty acids, tung oil, tung fatty acids, linseed oil, linseed fatty acids, safflower oil or safflower fatty acids;

the polycarboxylic acid or anhydride thereof in (c) is maleic acid, maleic anhydride, fumaric acid, succinic acid, succinic anhydride, adipic acid, isophthalic acid, phthalic acid, or phthalic anhydride; and the carboxy-substituted monomer, hydroxy-substituted monomer, and non-carboxy-non-hydroxy-substituted monomer each contains a $H_2C=C<$ substituent.

5. A prepolymer according to claim 4 wherein:

the carboxy-substituted monomer is acrylic acid, methacrylic acid, or itaconic acid;

the hydroxy-substituted monomer is 2-hydroxy-ethyl acrylate, 2-hydroxyethyl methacrylate, 4-hydroxybutyl acrylate, trimethylolpropane monoallyl ether, or pentaerythritol monoallyl ether; and the non-carboxy-non-hydroxy-substituted monomer is ethylene, butadiene, styrene, ethyl acrylate, methyl methacrylate, or vinyl acetate.

6. A prepolymer-modified alkyd resin according to claim 5 wherein:

the homogeneous condensation product is formed additionally from a molecular weight regulator selected from the group consisting of non-polymerizable monocarboxylic acids; and the prepolymer is used in an amount corresponding to between about 5 percent by weight and about 50 percent by weight of the total weight of the prepolymer-modified alkyd resin.

7. A prepolymer-modified alkyd resin according to claim 6 wherein the molecular weight regulator is benzoic acid.

References Cited

UNITED STATES PATENTS

| | | | |
|---|---|---|---|
| 2,962,460 | 11/1960 | Chapin et al. | 260—21 |
| 3,290,411 | 12/1966 | Tsuji et al. | 260—873 |
| 3,468,826 | 9/1969 | McWhorter et al. | 260—22 |

FOREIGN PATENTS

| | | | |
|---|---|---|---|
| 901,934 | 7/1962 | Great Britain | 260—873 |

DONALD E. CZAJA, Primary Examiner

R. W. GRIFFIN, Assistant Examiner

U.S. Cl. X.R.

117—161K; 260—23P, 33.6UA, 33.6R, 873